United States Patent [19]

Lakshman et al.

[11] Patent Number: 6,078,564
[45] Date of Patent: Jun. 20, 2000

[54] SYSTEM FOR IMPROVING DATA THROUGHPUT OF A TCP/IP NETWORK CONNECTION WITH SLOW RETURN CHANNEL

[75] Inventors: T. V. Lakshman, Monmouth, N.J.; Upamanyu Madhow, Urbana, Ill.; Bernhard Suter, Monmouth, N.J.

[73] Assignee: Lucent Technologies, Inc., Murray Hill, N.J.

[21] Appl. No.: 08/858,310

[22] Filed: May 19, 1997

Related U.S. Application Data

[60] Provisional application No. 60/025,122, Aug. 30, 1996.

[51] Int. Cl.[7] .................................................. G01R 31/08
[52] U.S. Cl. .......................................... 370/235; 370/236
[58] Field of Search .................................... 370/229, 235, 370/237, 252, 253, 330, 465, 468, 522, 467; 375/240, 260

[56] References Cited

U.S. PATENT DOCUMENTS

| | | | |
|---|---|---|---|
| 5,497,375 | 3/1996 | Hluchyj | 370/389 |
| 5,530,703 | 6/1996 | Liu | 370/389 |
| 5,586,121 | 12/1996 | Moura | 370/236 |
| 5,673,290 | 9/1997 | Cioffi | 370/210 |
| 5,781,533 | 7/1998 | Manning | 370/236 |
| 5,818,845 | 10/1998 | Moura | 370/449 |
| 5,828,655 | 10/1998 | Moura | 370/236 |
| 5,862,335 | 1/1999 | Welch | 395/200.54 |

OTHER PUBLICATIONS

T.V. Lakshman, A. Neidhardt and T.J. Ott, "Drop From Front Strategy in TCP over ATM and its Interworking with Other Control Features" Proc. Infocom '96, pp. 1242–1250, Mar. 1996.

Vivek Arora, Narin Suphasindhu, John Baras and Douglas Dillon, "Asymmetric Internet Access over Satellite–Terrestrial Networks", American Institute of Aeronautics and Astronautics, 1995.

*Primary Examiner*—Ajit Patel
*Assistant Examiner*—Ricardo M. Pizarro

[57] ABSTRACT

A data transmission control arrangement for an asymmetric communication system having a fast downstream link enabling communication of information packets from a service provider to one or more subscriber terminal connected through a common network terminal, and a slow upstream link including transmitting packets from a subscriber terminal through the network terminal to the service provider, the data transmission control arrangement including a classifier device for classifying information packets received by the network terminal for transmission over the upstream link, the information including data packets and acknowledgement packets; a control device for establishing one or more upstream link connection queues in the network terminal in accordance with the classification of the information packet to be transmitted, the upstream connection queues including one or more data queues for transmitting data information and ACK queues for transmitting ACK packets in response to data packets communicated over the downstream link, the control device enabling a later received ACK packet to replace one previously received ACK packets stored in a particular upstream link connection queue; and, a scheduler for servicing each of the upstream connection queues and transmitting packets from the upstream link connection queues to the service provider in accordance with transmission parameters of both upstream and downstream links.

4 Claims, 2 Drawing Sheets

SYSTEM FOR IMPROVING DATA THROUGHPUT OF A TCP/IP NETWORK CONNECTION WITH SLOW RETURN CHANNEL

RELATED APPLICATIONS

This application claims the benefit of provisional U.S. patent application Ser. No. 60/025,122 filed Aug. 30, 1996.

FIELD OF THE INVENTION

The invention relates generally to protocols for transporting data packets over a network connection and, more particularly, to an improved method for transporting data over the Internet Transport Protocol commonly referred to as TCP/IP.

BACKGROUND OF THE INVENTION

It is expected that, within the foreseeable future, high speed Internet access services to residential subscribers will be provided using asymmetric access networks, which include, for example, (a) networks employing Asymmetric Digital Subscriber Line (ADSL) and variations thereof; (b) Hybrid Fiber Coax (HFC) networks; and, (c) networks where the downstream path (network to subscriber) is a cable link and the upstream path (subscriber to network or service provider) is a telephone link. One aspect of these systems is that they have an inherent bandwidth asymmetry which may be as low as 10 when particular types of cable modems or ADSL access services are used in the associated network, or as high as 100 or more when the return path is a telephone link. Thus, an asymmetric network may be characterized as having a fast downstream link from the network to the subscriber and a slower upstream link from the subscriber to the network. Also, it is likely that such a network will use the well-known Internet transport protocol, TCP/IP, to transport data.

Briefly, TCP/IP is a window-based flow control protocol, in which a source of data transmits sequentially numbered data packets to a destination. The destination, responsive to receipt of the data packets, returns a so-called cumulative acknowledgment (ACK) which identifies by sequence number the next expected data packet. If the destination receives correctly all of the data packets up to sequence number N, then the destination indicates that the next data pack it expects to receive is packet number N+1. In TCP/IP, the source maintains a dynamically varying window size. A window size of W packets means that the source may send data packets respectively having sequence numbers up to n+W when the acknowledgment it receives from the destination indicates that the next expected packet is n+1. If the round trip delay between the source and destination is relatively large, then the widow size is typically a large value for efficient management of the associated bandwidth. This is done in TCP by increasing the size of the window until a transmitted data packet is lost, and then decreasing the size of the window to a more efficient value. (It is noted that the amount that the window is decreased is different for different forms of TCP—illustratively TCP-Tahoe and TCP-Reno.) The loss of a packet in TCP/IP is detected using preferably a "fast retransmit" scheme, one that is typically based on receiving several acknowledgments (hereinafter "ACKS") each identifying the same next expected data packet (e.g., N+1). Such ACKs imply that packet N+1 had been lost and needs to be retransmitted. A "fast retransmit" is typically triggered when a given packet (e.g., n+1) is lost, but a number of successive packet were received correctly by the destination. Disadvantageously, however, if all of the packets after n+1 are lost, or if n+1 is the last packet sent by the source, then the "fast retransmit" packet scheme may fail to detect the loss. To deal with that possibility, then such detection relies on the expiration of an "coarse" timer having a "granularity" of, for example, 500 milliseconds, is used to detect the loss of such a packet. That is, when a packet is transmitted the timer is started to wait for the receipt of a corresponding ACK. If the ACK is not received prior to the expiration of the timer, then it is assumed that the packet was lost, which means that the transmission link will remain idle for that period of time, since new packets are typically not transmitted prior to the expiration of the timer.

It is apparent from the foregoing that TCP connections are established in both directions on a network. In particular, as shown in FIG. 1 illustrating a conventional single TCP connection, a forward connection 20 uses the fast downstream link 25 to carry packets from a sender 15 (in the network) to a data terminal 16 (subscriber side). The data terminal 16, on the other hand, uses the slow upstream link 26 to send ACKs to the network sender 15. Conversely, a reverse connection uses the upstream link 26 for sending data packets from the data terminal 16 to the network sender 15 and the downstream link 25 for sending acknowledgments from the network sender to the data terminal. A TCP destination returns explicitly or implicitly an ACK for every data packet that it receives successfully. Most ACKs have to be explicit because TCP uses ACK for congestion control as well. Hence, a large volume of data packets received over the downstream link 25 will cause a large volume of ACKs to be carried over the upstream link 26. Clearly, then, this may cause congestion to occur on the upstream link, and specifically, at the single upstream buffer, 30, the which may lead to a loss of data packets for the reverse connections. As mentioned above, such losses may cause the reverse connections to decrease the size of their respective windows—which would cause an appreciable decrease in throughput to occur unless the resources (e.g., buffers and bandwidth) of the upstream link are specifically allocated to those connections in a controlled way. Also, a loss of ACKs may cause an increase in burstiness at the sender. For example, assume that the size of the window is W and that the source is waiting for an ACK corresponding to packet n—meaning that, if the window is fully used, packets up to n+W have been sent. Also assume that the destination received successfully all packets, but the ACKs associated with packets n through n+4 were lost and that the ACK for packet n+5 was received successfully by the source. When the source receives the latter ACK, then the source "knows" that the next expected data packet is the n+6 packet, and, therefore, should be allowed to transmit packets up to n+5+W. Since the source only sent packets up to n+W, it is then allowed to transmit the next five packets. If the buffer is smaller than 5, then this would cause packets to be lost, which may cause a decrease in the size of the corresponding window. Also, a loss of all outstanding ACK packets would lead inevitably to a time-out, decrease in the size of the window and decrease in the efficiency of the system. Moreover, this is likely to happen whenever the size of W is small (e.g., W=1).

SUMMARY OF THE INVENTION

Thus, in view of the foregoing, we have recognized that bandwidth needs to be reserved on the upstream link for the proper operation of the reverse connection, such bandwidth also needs to be reserved for the transport of ACKs that are sent as a result of receiving data packets via the downstream link. If sufficient bandwidth is not allocated to handle the transmission of ACKS, then the asymmetry of the bandwidth between the forward and reverse paths of a forward connection may cause excessive burstiness to occur on the forward path, which could lead to a loss of data packets and a decrease in throughput due to a decrease in the size of the window. Thus, the reservation of bandwidth on the upstream link must be managed well to obtain good performance for both the forward and reverse connections. This is done, in accordance with the principles of the invention by (a) preserving at a point of congestion along the reverse link, e.g., a buffer, the last ACK in place of a previously received ACK, (b) allocating the bandwidth of the upstream link including associated memory (buffer) in a well managed way, and (c) using, for e.g., a fair-queuing or a weighted round-robin scheme to allocate the bandwidth of the upstream link such that the weighting is based on parameters associated with the downstream link. This is achieved while maintaining the bandwidth ratio of forward to reverse path of each connection below a predetermined boundary.

Specifically, when congestion occurs, we preserve the last (most recent) ACK transmitted by the destination and do so by illustratively dropping an ACK that is stored at the "front/top" of a congested upstream buffer to make room for the storage of the most recent ACK. Also, the loss of data packets on reverse connections is prevented by reserving bandwidth on the upstream link for the transport of the data packets. In accord with an aspect of the invention, such reservation of bandwidth is achieved by using logically separate data buffers for the data packets and ACKS in the return (upstream) path. Further, the servicing of the upstream link is based on a weighted round robin service in conjunction with a queue per connection, in which, in accord with an aspect of the invention, such weights are chosen according to particular parameters associated with the downstream link. In particular, if, for example, the downstream link has a transmission rate of $C_d$ packets/second and the size of the buffer on the upstream link is $B_d$ packets, then the available bandwidth for ACKs on the upstream link for an associated forward connection should be at least $C_d/B_d$ ACKs per second. All of the remaining bandwidth on the upstream link may then be allocated to data packets from reverse the connections carried over of the upstream link. The separate buffers and weighted service sheme is essential to ensure that that reverse connections get their fair share of bandwidth.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE INVENTION

Figure 2:
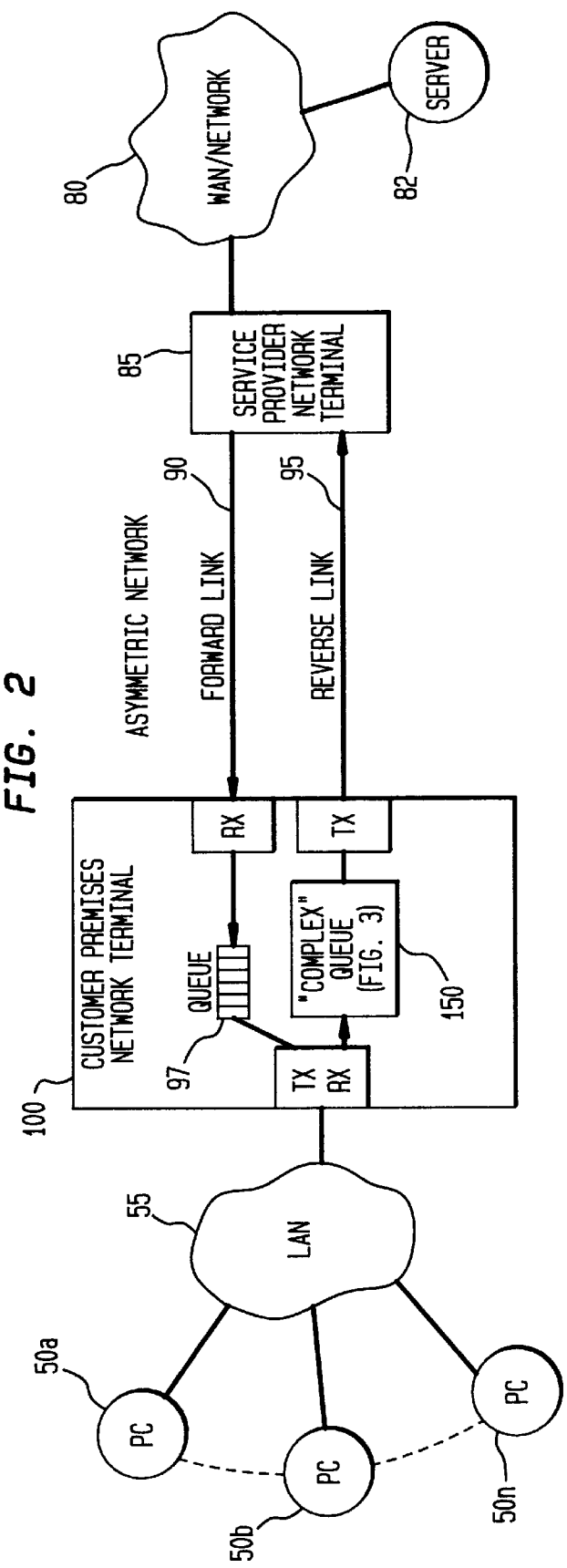
FIG. 2 is a context diagram incorporating a complex queue buffer in the upstream link of a single TCP connection.

FIG. 2 illustrates a data flow-control arrangement for a TCP network connection, and particularly, is a context diagram showing the inventive TCP connection servicing a multiplicity of user PCs 50a,50b, . . . , 50n. As shown in FIG. 2, each customer PC 50a, . . 50n etc. is connected to a local area network 55 including a connection or subscriber network terminal 100. The subscriber network terminal 100 receives data packets from a forward (downstream) link 90 connection from a service provider, e.g., WAN/Internet 80, serviced by a server 82. Specifically, these data packets are communicated from a service provider network terminal 85 over forward link 90 for receipt by the subscriber local area network 55 which distributes or demultiplexes the packets to the appropriate customer termination (PC). The subscriber network terminal 100 includes a forward queue 97 that temporarily stores and passes the received data packets to the subscriber local area network at a particular rate. The customer PC's, in turn, provide acknowledgment (ACK) packets for receipt by the service provider network 85 via a reverse (upstream) link 95. The PC's may even provide data packets to the subscriber local area network 55 which, in turn, multiplexes the data for upstream transmission to the network terminal 100. As discussed above, the prior art TCP connection architecture is characterized as being asymmetric having a faster downstream link 90 from the service provider network 85 to the subscriber network 55, and a slower upstream link 95 from the subscriber network 55 to the service provider network 85, normally causing bottleneck, random loss of packets, and intolerable delays and throughputs in conventional TCP/IP connection architectures. To ensure maximum throughput of packets, the network terminal 100 is provided with an inventive reverse link "complex" queue 150 capable of establishing individual per connection queues for optimally forwarding both data and ACK packets to the service provider network terminal 85 over the reverse link 95. It is understood that the prevalent TCP-Tahoe and TCP-Reno protocols for Internet communication govern the upstream and downstream bit rates over respective forward and reverse links.

Figure 3:
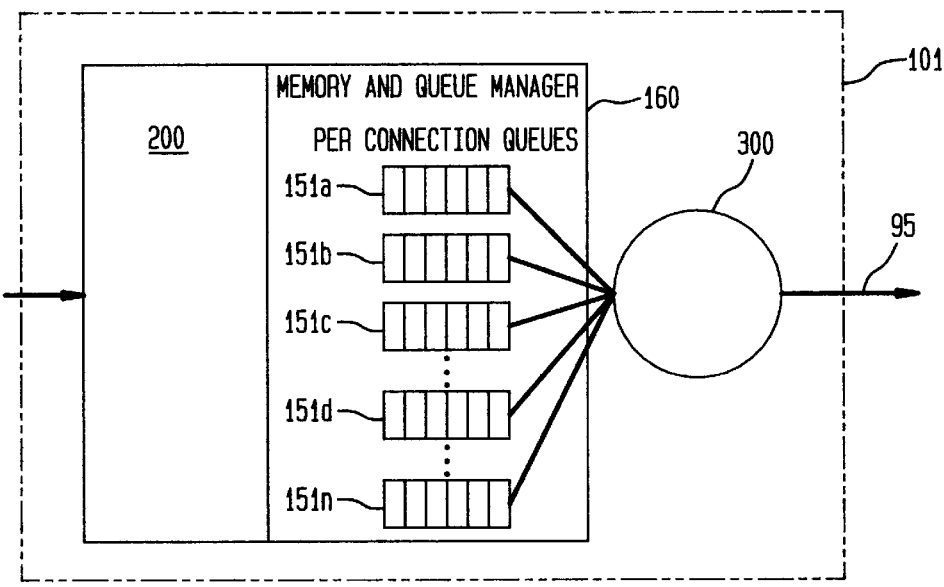
FIG. 3 is a block diagram illustrating the components of the inventive complex queue.

As shown in FIG. 3, the complex queue 150 includes a memory storage area facilitating the establishment of a plurality of per conection queues 151a, . . . , 151n. To maximize data throughput, as shown in FIG. 3, the complex queue 150 is structured as a front-end processor 101 that performs a queue management function, depicted as queue manager 160; a packet classification function, depicted as Classifier 200; and, a packet transmission scheduling function, depicted as Scheduler 300. The above-mentioned functions performed by the front-end processor cooperatively enables a plurality of buffer queues to be established on an as needed basis for storing and transmitting upstream bound packets of information on to the reverse link 95 in accordance with memory and queue management and scheduling policies.

For instance, under the control of the front-end processor 101, the Classifier 200 looks at every incoming packet from the subscriber network and classifies its type, e.g., data, ACK, etc. It also keeps track of the existing connections and their type, (greedy, sporadic, data, ACK), assigns a respective queue 151a, . . , 151n to each connection, and places the packet in the correct queue. Specifically, each of the source PC's 50a,b,c have a corresponding network address and port associated with it, and when sending data or ACKs to a destination address and port, a dynamic queue connection may be set up in memory to store the information for eventual transfer to the destination address/port. The classifier 200 generates and maintains a table (not shown) of queue connections established for particular source address/ports and correponding destination address/ports, thus keeping track of the upstream communication of data or ACKs between particular source and destinations. Depending upon the cost and/or memory constraints of the system, one queue 151 may be dynamically established for receipt of, e.g., data packets and another queue may be established for receipt of, e.g., ACK packets regardless of the number of transmitting sources. Thus, it is preferred however, that a queue be established for each distinct TCP connection. In practice, it is expected that the number of queues will be limited and queue occupancy schemes will be enforced by the memory and queue manager to enable dynamic replacement when all queues are occupied.

As shown in FIG. 3, the memory and queue manager 160 stores packets in memory queues and enforces queue occupancy policies. Particularly, when all of the queues are occupied and a new source/destination connection is established, the queue manager may dynamically enable a queue to become available for upstream transmission of new packets between the new source/destination connection. Within the constraints of the TCP/IP protocol implemented, e.g., TCP-Tahoe, one scheme is to implement a time-out function whereby the queue manager determines inactivity of a queue established for another source/destination connection, i.e., the occupied queue neither receives a packet nor transmits any packets within a certain period of time, e.g., five minutes. The table of the per queue connections in the Classifier 200 will be updated accordingly.

Additionally, as explained herein, the queue manager 160 implements a first received packet rule, which enables the queue manager to always keep the last received packet in a queue under any circumstances, and drop any older packet from the queue.

A crucial aspect of the physical link layer of this system, is to determine when the reverse link layer is free, e.g., after a packet has been transmitted. According to the particular system requirements, e.g., ADSL, HFC, etc., there exists well-known hardware implementations to ascertain the occupancy (used bandwidth) and the status other parameters of the forward and reverse links. Once a determination is made that the reverse link is free to transmit, the Scheduler 300 services the queues by selecting a packet from a particular queue 151a, . . . , 151n to be transmitted according to transmission management policies. Such transmission management policies include, e.g., fair-weighted queuing, where each queue is given equal service time. Thus, in the case of transmitting ACK packets in accordance with the weighted scheme, the processor will determine critical parameter information about the forward (downstream) link 90 such as downstream transmission rate, $C_{down}$ (bits/second) and size of the downstream bottleneck (forward link) buffer $B_{down}$, and, additionally, information about the upstream link such as upstream transmission rate, $C_{up}$ (bits/second) and the length of, e.g., an ACK packet, $L_{ACK}$, so that the scheduler may calculate a weight, $W_{ACK}$, for the particular ACK packet and transmit the ACK packet according to its weight so as to maximize transmission bandwidth. As will be described, the parameter information implicitly accounts for the round-trip delay times, forward buffer sizes and the normalized asymmetry in the network connection. It should be understood that selection of data packets for transmission over the reverse (upstream) link may be likewise determined.

Figure 4:
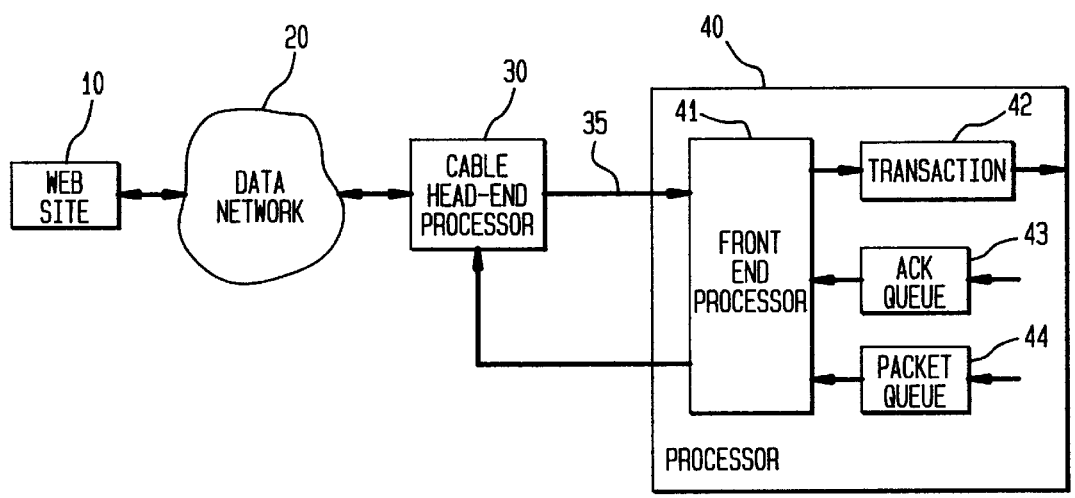
FIG. 4 is an illustrative example of an internet connection utilizing the data flow control arrangement of the invention.

To further aid in the understanding of the invention, reference is made to FIG. 4, which illustrates a general example of an Internet connection 50 established between a processor 40, and a web site 10 for the purpose of downloading information from web site 10 to processor 40 via data network 20. The Internet connection includes a control processor 30 and downstream link 35, which may be, for example, a conventional cable link, that connects to a plurality of subscribers. The downstream link 35 connects to a plurality of subscribers, including processor 40, via respective interface devices (not shown), e.g., cable modems. If processor 40 happens to be, for example, a personal computer, then it is likely that the connection was initiated in a conventional manner at the request of a user (not shown). This is typically done by using the well-known TCP protocol and transmitting the message over an upstream link, e.g., a conventional telephone connection, to controller 30. Controller 30 then forwards the message via data network 20 to the Internet web site identified in the message, e.g., web site 10. Web site 10, in turn, transmits the requested information in the form of data packets via the aforementioned downstream link to processor 40. Front end processor 41 receives the downstream packets and forwards them to the appropriate transaction, e.g., transaction 42. The transaction, in turn, generates a conventional ACK packet in the TCP format and stores the packet in ACK queue 43 for transmission via the upstream link to web site 10.

As mentioned above, it is likely that under particular conditions the ACK queue (buffer) 43 may become congested (full). In that case, then, a new ACK is usually discarded since it cannot be loaded into the queue. Since the new ACK contains more information that an ACK already stored in the queue, then, in accordance with the invention, the new ACK (i.e., the last ACK to be generated) is preserved rather than discarded. Thus, an ACK that is already loaded in ACK queue 43 is discarded to make room in the queue for the latest ACK. In an illustrative embodiment of the invention, the oldest ACK in the queue is discarded.

The acknowledgement packets serve another purpose in TCP, i.e., the data packets are released at a controlled rate based on the arrival of acknowledgements to the data source. Excessive acknowledgement packet loss, even while preserving error recovery information as described herein, can cause disruption of this flow control mechanism. If N acknowledgements are lost, then the arrival of the $(N+1)^{th}$ acknowledgement causes the source to release $(N+1)$ packets simulteneously. If the data buffer is not large enough to absorb this burst, then data packets are lost, causing TCP to drop its window, and hence resulting in low throughput. Hence, the management of the acknowledgement buffer must be such as to let the most number of acknowledgements through, while always preserving the most recent acknowledgement. This leads to the drop-from-front buffer discipline for the return path which preserves the most recent error recovery information and enables the largest amount of flow control information.

Figure 1:
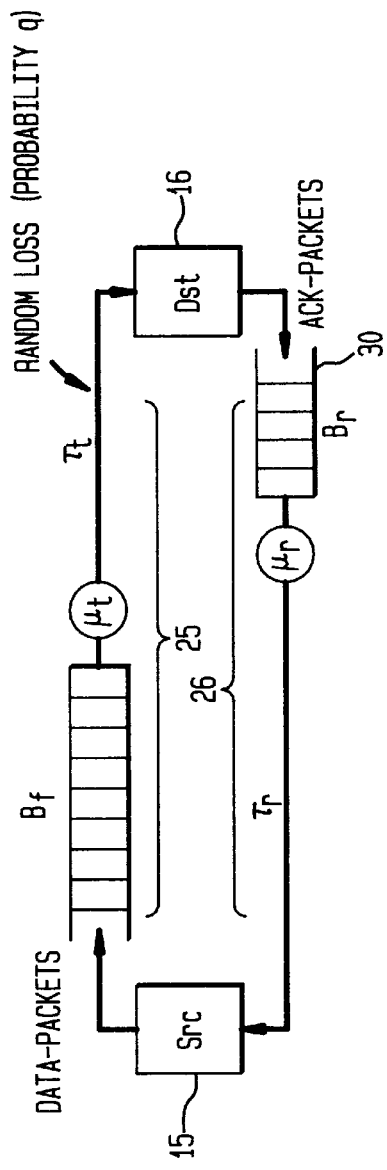
FIG. 1 is a general diagram illustrating a conventional single TCP/Internet connection.

It is seen from the FIG. 4 that processor 40 also includes packet queue 44, which may be associated with a particular "reverse connection" transaction process that is generating conventional data packets for transmission via upstream link 36. As mentioned above, under certain conditions, the throughput of the reverse connection may be close to zero unless the resources of the upstream link are allocated in a controlled way. As also mentioned above, such allocation is done, in accord with an aspect of the invention, by dedicating queues to respective services, connections, ACKS, data packets, etc., and servicing the queues in accordance with a weighted scheduling scheme. Specifically, in accordance with the invention, it is assumed that downstream link 35 (FIG. 1) has a rate of $C_{down}$ bits/second and that slower upstream link 36 has a rate of $C_{up}$ (bits/second).

Additionally, it is assumed that TCP connections are supported in either link and that the length of a data packet is $L_{DATA}$ and the length of an ACK is $L_{ACK}$. For a forward connection, the maximum bandwidth available for a data packets is $$\mu_f = \frac{C_{down}}{L_{DATA}}$$

packets per second, and the maximum bandwidth available for ACK packets is $$\mu_r = \frac{C_{up}}{L_{ACK}}.$$

The "normalized asymmetry" between the forward and reverse paths is then defined as $k=\mu_f/\mu_r$, which is assumed to be a value >1. The size of a buffer that is available for buffering data packets that are to transported over downstream link 35 is assumed to be $B_{down}$ bits, which translates into $$B_f = \frac{B_{down}}{B_{DATA}}$$

packets. The percentage of the total time that may be allocated to the servicing of ACK queue 43 is:

$$\frac{W_{ACK}}{W_{ACK} + W_{data}} C_{up} \quad (1)$$

To achieve near optimum service (throughput) of those queues in accordance with the invention, the following relation of equation (2) specifies the weights that should be associated with ACK queue (buffer) 43 and, the following relation of equation (3) specifies the weights that should be associated with data packet queue (buffer) 44:

$$W_{ACK} \leq \frac{C_{down} L_{ACK}}{B_{down} C_{up}} \quad (2)$$

$$W_{DATA} = 1 - W_{ACK} \quad (3)$$

It should be understood that it is not possible to fully utilize the downstream link if the value of $W_{ACK}$ in equation (2) is larger than one. Furthermore, it should be realized that more than one source could be supplying data packets to the upstream link. In that case, then, each such source should be associated with its own packet/data queue to achieve the most efficient servicing of the packets and, thus, the throughput of the upstream link.

It is to be understood that the above general description is just one illustrative example of a number of different ways which implement weighted scheduling that satisfies the conditions that for each connection the ratio of available packet service rate and available ACK service rate is smaller than the available buffer size on the forward path. That is, for each connection $k=\mu_f/\mu_r$ which is also equivalent to the average size of a burst of packets, has to be smaller than $B_f$, or else packets will be lost unnecessarily. If, due to imperfection of the scheduler (head of line blocking) "k" varies locally with time, the worst case has to be considered. Thus, a scheduler such as a fluid model scheduler, is designed to minimize local deviation from the allocated rates.

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. A data transmission control arrangement for an asymmetric communication system having a downstream link enabling communication of information packets from a service provider to one or more subscriber terminals connected through a common network terminal, and an upstream link for transmitting upstream packets from said one or more subscriber terminals through said network terminal to said service provider, said data transmission control arrangement including:

for said network terminal, a classifier for classifying said upstream packets received by said network terminal for transmission over said upstream link, said upstream packets including data packets and acknowledgment packets;

a controller for establishing upstream link connection queues in said network terminal in accordance with classifications of the upstream packets to be transmitted, said upstream link connection queues including one or more data queues for transmitting said data packets and one or more acknowledgment queues for transmitting acknowledgment packets in response to said information packets communicated over said downstream link, said controller enabling a later received acknowledgment packet to replace an oldest previously received acknowledgment packet stored in a particular upstream link connection queue; and, a scheduler for servicing each of the upstream link connection queues and transmitting said data packets and said acknowledgment packets from said upstream link connection queues to said service provider in accordance with transmission parameters of both upstream and downstream links;

wherein said network terminal includes memory storage from which said upstream link connection queues are established, said controller further allocating said memory storage to establish a separate upstream link connection queue for each connection between said one or more subscriber terminals and said service provider.

2. A data transmission control arrangement for an asymmetric communication system having a downstream link enabling communication of information packets from a service provider to one or more subscriber terminals connected through a common network terminal, and an upstream link for transmitting upstream packets from said one or more subscriber terminals through said network terminal to said service provider, said data transmission control arrangement including:

for said network terminal, a classifier for classifying said upstream packets received by said network terminal for transmission over said upstream link, said upstream packets including data packets and acknowledgment packets;

a controller for establishing upstream link connection queues in said network terminal in accordance with classifications of the upstream packets to be transmitted, said upstream link connection queues including one or more data queues for transmitting said data packets and one or more acknowledgment queues for transmitting acknowledgment packets in response to said information packets communicated over said downstream link, said controller enabling a later received acknowledgment packet to replace an oldest previously received acknowledgment packet stored in a particular upstream link connection queue; and, a scheduler for servicing each of the upstream link connection queues and transmitting said data packets and said acknowledgment packets from said upstream link connection queues to said service provider in accordance with transmission parameters of both upstream and downstream links;

wherein said classifier includes means for generating a table of established upstream link connection queues and their respective associated service provider and subscriber terminal connections;

said controller responsive to said classifier for inputting received packets to an upstream link connection queue according to associated service provider and subscriber terminal connection status.

3. A data transmission control arrangement for an asymmetric communication system having a downstream link enabling communication of information packets from a service provider to one or more subscriber terminals connected through a common network terminal, and an upstream link for transmitting upstream packets from said one or more subscriber terminals through said network terminal to said service provider, said data transmission control arrangement including:

for said network terminal, a classifier for classifying said upstream packets received by said network terminal for transmission over said upstream link, said upstream packets including data packets and acknowledgment packets;

a controller for establishing upstream link connection queues in said network terminal in accordance with classifications of the upstream packets to be transmitted, said upstream link connection queues including one or more data queues for transmitting said data packets and one or more acknowledgment queues for transmitting acknowledgment packets in response to said information packets communicated over said downstream link, said controller enabling a later received acknowledgment packet to replace an oldest previously received acknowledgment packet stored in a particular upstream link connection queue; and, a scheduler for servicing each of the upstream link connection queues and transmitting said data packets and said acknowledgment packets from said upstream link connection queues to said service provider in accordance with transmission parameters of both upstream and downstream links, said transmission parameters associated with said downstream link include downstream transmission rate, $C_{down}$ (bits/second) and size of said downstream buffer $B_{down}$.

4. A data transmission control arrangement for an asymmetric communication system having a downstream link enabling communication of information packets from a service provider to one or more subscriber terminals connected through a common network terminal, and an upstream link for transmitting upstream packets from said one or more subscriber terminals through said network terminal to said service provider, said data transmission control arrangement including:

for said network terminal, a classifier for classifying said upstream packets received by said network terminal for transmission over said upstream link, said upstream packets including data packets and acknowledgment packets;

a controller for establishing upstream link connection queues in said network terminal in accordance with classifications of the upstream packets to be transmitted, said upstream link connection queues including one or more data queues for transmitting said data packets and one or more acknowledgment queues for transmitting acknowledgment packets in response to said information packets communicated over said downstream link, said controller enabling a later received acknowledgment packet to replace an oldest previously received acknowledgment packet stored in a particular upstream link connection queue; and, a scheduler for servicing each of the upstream link connection queues and transmitting said data packets and said acknowledgment packets from said upstream link connection queues to said service provider in accordance with transmission parameters of both upstream and downstream links, said transmission parameters associated with said upstream link include an upstream packet transmission rate, $C_{up}$ (bits/second) and a length of an acknowledgment packet, $L_{ACK}$.

* * * * *